United States Patent
Marsili et al.

(10) Patent No.: US 7,365,662 B2
(45) Date of Patent: Apr. 29, 2008

(54) DC-OFFSET CORRECTION CIRCUIT FOR A COMMUNICATION SYSTEM AND METHOD OF CORRECTING A DC-OFFSET IN A COMMUNICATION SYSTEM

(75) Inventors: Stefano Marsili, Fürnilz (AT); Raffaele Salerno, Tavagnacco—Udina (IT); Yossi Erlich, Hod Hasharon (IL); Manfred Punzenberger, Villach (AT); Andreas Wiesbauer, Pörtschach (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/492,575

(22) Filed: Jul. 25, 2006

(65) Prior Publication Data

US 2008/0024337 A1    Jan. 31, 2008

(51) Int. Cl.
*H03M 1/06* (2006.01)
(52) U.S. Cl. .................... 341/118; 341/155; 341/120
(58) Field of Classification Search ............... 341/118, 341/120, 145, 155, 143, 144; 375/316, 319, 375/132

See application file for complete search history.

(56) References Cited

U.S. PATENT DOCUMENTS 5,677,527 A * 10/1997 Cheng .................... 250/208.1
7,129,867 B2 * 10/2006 Kim et al. ................. 341/118
2006/0120435 A1 * 6/2006 Punzenberger et al. ..... 375/132

OTHER PUBLICATIONS

"A 5.2-GHz CMOS Receiver with 62-dB Image Rejection", Behzad Razavi, 2000 Symposium on VLSI Circuits Digest of Technical Papers, pp. 34-37.
"MultiBand OFDM Physical Layer Specification, MultiBand OFDM Alliance" Standard, Release 1.0, Jan. 14, 2005, Copyright © 2005 by MultiBand OFDM Alliance Special Interest Group, 142 pgs.

* cited by examiner

*Primary Examiner*—Peguy JeanPierre
(74) *Attorney, Agent, or Firm*—Eschweiler & Associates, LLC

(57) ABSTRACT

A DC-offset correction circuit includes an analog circuit to generate a plurality of analog offset-correction signal values, each of which are assigned to a hop band. The analog circuit is coupled to a tap of an analog receiver chain and includes a first analog selector to select an analog offset-correction signal value, the selected analog offset correcting signal value being assigned to a current hop band. Further, the DC-offset correction circuit includes a combiner to combine a received signal with the selected analog offset-correction signal value and feed the analog receiver chain.

18 Claims, 4 Drawing Sheets

DC-OFFSET CORRECTION CIRCUIT FOR A COMMUNICATION SYSTEM AND METHOD OF CORRECTING A DC-OFFSET IN A COMMUNICATION SYSTEM

FIELD OF THE INVENTION

The invention relates to a DC-(direct current-) offset correction circuit for a receiver of a band-hopping communication system. Further, the invention relates to a receiver of a band-hopping communication system with a plurality of hop bands, comprising the DC-offset correction circuit.

BACKGROUND OF THE INVENTION

FIG. 1 is a block diagram of a conventional wireless direct-conversion receiver. The high-frequency signal, received by an antenna, is amplified by a low-noise amplifier (LNA) 1 and a programmable gain amplifier (PGA) 2. Then the signal is directly down-converted to a complex baseband signal by a quadrature mixer 3, receiving two orthogonal local oscillator (LO) signals LO-I and LO-Q, with the frequency of the fundamental wave of the signals LO-I and LO-Q equaling the mid-band frequency of the high-frequency signal. The in-phase signal I', down-converted by LO-I, is fed in an in-phase baseband path of the receiver, whereas the quadrature-phase signal Q', down-converted by LO-Q, is fed in a quadrature-phase baseband path of the receiver. Owing to various effects the two baseband signals I' and Q' at the outputs of the mixer 3, may be affected by an unknown and unpredictable DC-offset.

One reason for a DC-offset may be LO-leakage. Owing to a limited isolation, the LO-signal LO-I or LO-Q may inject in the high-frequency signal input of the mixer 3 or in the input of the LNA 1 or the PGA 2. The injected LO-signal is mixed with LO-signals LO-I and LO-Q, resulting in a DC component at the outputs of the mixer 3.

Yet another reason for a DC-offset may be self-mixing. In the case of self-mixing, the high-frequency signal at the input of the mixer 3 is injected to the LO-ports of the mixer 3. Thus, the high-frequency signal is self-mixed with an attenuated image of the high-frequency signal, resulting in a DC component at the outputs of the mixer 3.

The DC-offset is typically time variant, depending on the gain setting in the high-frequency part of the receiver. In communication systems with a plurality of possible transmitters as in WLAN-systems (wireless local area network) according to IEEE 802.11 and in ultrawideband (UWB) systems, in particular in multiband orthogonal frequency division multiplexing (MB-OFDM) systems, the offset at the output of the mixer 3 may change from burst to burst as the transmitter may change.

Additionally, in band hopping systems, e.g. in MB-OFDM systems or in Bluetooth systems, the DC-offset may vary from frequency band to frequency band as the LO-leakage effect is frequency dependent.

Each DC-offset, present at both outputs of the mixer 3, is further amplified by the cascaded PGAs 4a/b and 5a/b in the I- and the Q-path of the receiver and could lead to a signal clipping in the baseband section. Additionally, the offset reduces the dynamic range, available at the receiver chain and especially at the analog-to-digital converters (ADC), which are typically located at the output of the receiver in FIG. 1.

In addition to the offset generated by the mixer 3, the stages in front of the mixer 3, i.e. the LNA 1, the PGA 2 and the stages connected behind or after the mixer 3, i.e. the PGAs 4a/b and 5a/b and the LPFs (low-pass filters) 6a/b and 7a/b, may introduce further DC-offsets, e.g. by a parameter mismatch between transistors of a transistor pair. These additional DC-offsets may also vary in time, depending on the particular gain setting, temperature variations and power supply variations.

Conventional analog or digital DC-offset correction circuits typically employ a feedback-loop to correct the DC-offset. Conventionally, the signal in the receiver chain is coupled (via an ADC in a digital implementation) to a controller means, with the controller means generating an offset correction signal, which is fed back (via a DAC, i.e. a digital-to-analog converter, in a digital implementation) to the receiver chain.

In modern wireless communication standards based on frequency hopping, the band transition time is relatively short, e.g. roughly 10 ns for an MB-OFDM communication system. After this band transition time the band-specific DC-offset should be significantly eliminated in a short time interval (roughly 30 ns). Conventional DC-offset correction circuits are typically not capable of correcting the DC-offset in such a short time interval.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

Throughout the present application the term "correction" also covers the meaning of "reduction". In accordance with one embodiment of the invention, a DC-offset correction circuit for a receiver of a band-hopping communication system with a plurality of hop bands includes an analog circuit for generating a plurality of analog offset-correction signal values. Each offset-correction signal value is assigned to one hop band. The analog circuit is coupled to a tap of an analog receiver chain of the receiver. The analog circuit comprises a first analog selector to select one analog offset-correction signal value from the plurality of analog offset-correction signal values. The selected analog offset-correction signal value is assigned to the current hop band. Further, the DC-offset correction circuit comprises a combiner to combine a received signal with the selected analog offset-correction signal value and feed the analog receiver chain.

In another embodiment of the invention, a DC-offset correction circuit for a receiver of a band-hopping communication system comprises an ADC. The ADC is coupled to a tap of the analog receiver chain of the receiver, or is connected downstream of the receiver chain as part of the receiver. The DC-offset correction circuit further comprises a digital circuit to generate a plurality of digital offset-correction signal values, with each offset-correction signal value being assigned to one hop band. The input of the digital circuit is coupled to the output of the ADC. The digital circuit comprises a first digital selector for selecting one digital offset-correction signal value from the plurality of digital offset-correction signal values. The selected digital offset-correcting signal value is assigned to the current hop band. Further, the DC-offset correction circuit comprises a DAC to receive the selected digital offset-correction signal value and output a selected analog offset-correction signal value. In addition, the DC-offset correction circuit comprises a combiner to combine a received signal with the selected analog offset-correction signal value and feed the analog receiver chain.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Embodiments of the invention are better understood with reference to the following drawings.

DETAILED DESCRIPTION OF THE INVENTION

For the description of the illustrative embodiments of the invention, the following signal transmission model is considered (however, the invention is not limited thereto): At first, the signal is transmitted in signal bursts. Further the transmission may be a multi-point to multi-point transmission, i.e. a plurality of individual transmitters transmit data to a plurality of individual receivers. In addition, in one example the receiver does not know prior to the burst transmission the gain setting needed and therefore the gain-dependent DC-offset of the receiver. Further, the transmitted signal, in one example is divided in symbols of a fixed duration. In addition, every symbol is transmitted in a different frequency band according to a defined hopping sequence. Furthermore, in one example for different bands different gain settings of the receiver are needed. Moreover, each burst, in one example contains a preamble for synchronizing the receiver and for setting the gain of the receiver.

Figure 1:
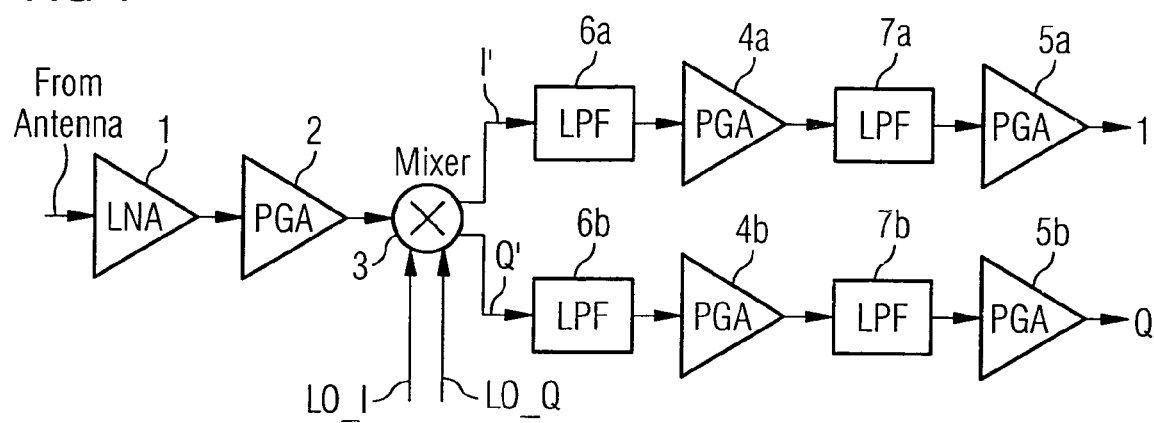
FIG. 1 is a block diagram of a conventional wireless direct-conversion receiver.
Figure 2:
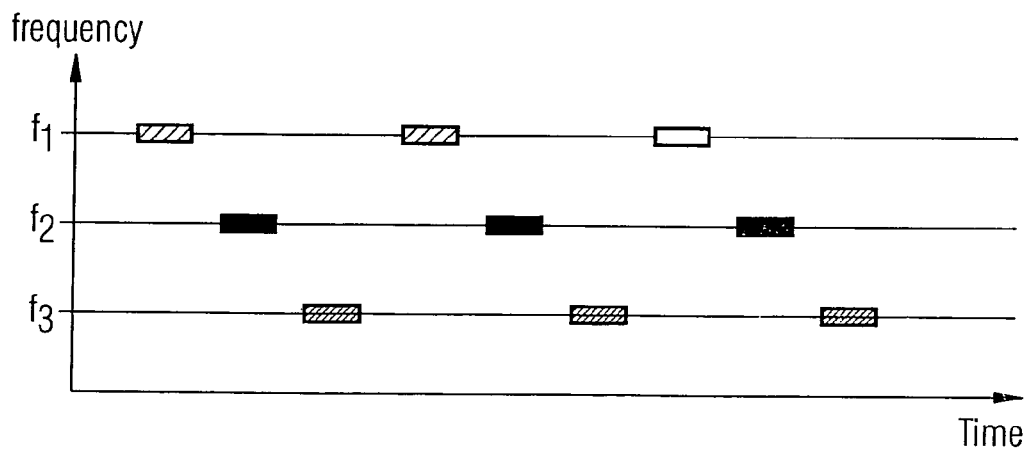
FIG. 2 is a signal diagram illustrating an exemplary hopping scheme.

FIG. 2 is signal diagram of an exemplary hopping scheme, considering the aforesaid signal transmission model. Here, the transmitter sends a burst containing by way of example 9 symbols. All symbols have the same duration in this example. For signal transmission a plurality of hop bands is provided, each characterized by its center frequency $f_1$ to $f_3$. Each symbol is transmitted in a different frequency band according to a defined hopping scheme (here: $f_1, f_2, f_3,$ $f_1, f_2, \ldots$ ). Between two symbols an idle time interval for the band transition is provided, with the idle time having a fixed duration in this example.

An exemplary communication system considering the aforesaid signal transmission model is an MB-OFDM system. An MB-OFDM system utilizes the unlicensed 3.1-10.6 GHz UWB-band. The UWB spectrum is divided into 14 bands, with each band having a bandwidth of 528 MHz. The first 12 bands are grouped into 4 band groups, each comprising 3 bands. For all devices it is mandatory to support the first band group with the center frequencies 3432 MHz, 3960 MHz and 4488 MHz. The remaining band groups are reserved for future use. Further, the system employs a multiband OFDM scheme for transmitting information from one device to another.

In OFDM-based communication systems, for example, each band is divided into a plurality of orthogonal subcarriers, with each subcarrier being individually modulated, typically according to PSK (phase shift keying) or QAM (quadrature amplitude modulation). Each OFDM-symbol contains the modulation sum of the single subcarriers. In the transmitter each OFDM-symbol, which is a signal in the frequency domain, is transformed by an inverse fast Fourier transformation based on the orthogonal subcarriers to a signal in the time domain. In the receiver each OFDM-symbol in the time domain is transformed to the frequency domain by a fast Fourier transformation and then demodulated.

In the aforesaid specification example, a total number of 110 sub-carriers (100 data carriers and 10 guard carriers) are used per band to transmit data. Furthermore, 12 pilot sub-carriers are provided. Each OFDM-symbol has a symbol length of roughly 242 ns. In addition, a zero-padded suffix of 37 samples (roughly 70 ns), equivalent to the aforesaid idle time, is appended to each OFDM-symbol. The zero-padded suffix serves two purposes: it provides a mechanism to mitigate the effects of multi-path, and it provides a time window to allow sufficient time for the transmitter and receiver to switch between the different center frequencies. Of these 70 ns, a duration of roughly 10 ns (5 samples) is reserved as a settling time between a band transition and a duration of 60 ns (32 samples) is reserved for the equalization of dispersive channels.

Furthermore, in this example each burst contains a preamble, which is transmitted at the beginning of each burst. The preamble has either a length of 30 or 18 symbols. Each preamble contains a packet/frame synchronization sequence and a channel estimation sequence.

In receivers, supporting the aforesaid signal transmission model, typically two different general operation phases are provided: an acquisition phase and a communication phase.

In the acquisition phase the preamble is received and the receiver synchronizes to the next burst. The term synchronization comprises the detection of a burst, the timing synchronization to the proper hopping scheme and the selection of the appropriate gain settings for each band. During the acquisition phase the receiver may work with a reduced signal quality.

At the beginning of the communication phase the receiver has already detected the burst and is synchronized. In the communication phase the receiver receives the data payload contained in the burst. The gain setting for each band is already defined. In contrast to the acquisition phase the receiver should work with the best possible signal-to-noise ratio (SNR). The communication phase includes also the channel estimation.

According to one embodiment of the invention the offset-correction for each band is estimated during the acquisition phase, as in the acquisition phase the receiver may work with a reduced signal quality and transients in the DC-offset owing to a DC-offset correction procedure are tolerable. In contrast, a variation in the DC-offset in the course of a DC-offset correction procedure during the communication phase would result in a degradation of the SNR. Thus, in the communication phase the DC-offset correction for each band is already estimated (and may be optionally updated during the communication phase), preferably providing a best-possible SNR during this phase. During the acquisition phase for every symbol the gain setting and the frequency band may change in order to provide a best-possible setting for the communication phase. Therefore, every time such change occurs, the value of a band-specific DC-offset should be reestimated as fast as possible. Referring to a MB-OFDM system a reasonable estimate should be achieved in a time interval significantly smaller than the duration of one OFDM-symbol.

Thus, corresponding to the acquisition phase and the communication phase, in one embodiment two operation modes are supported: In a first mode the DC-offset is estimated for each band, i.e. the offset-correction signal values are generated and stored, with the DC-offset being corrected. In a second mode the band-specific DC-offset is corrected by reading the appropriate stored offset-correction signal value. In one embodiment, the first mode is used during the acquisition phase while the second mode is used during the communication phase. The second mode could be also used later during the acquisition phase in case previously stored offset-correction signal values are considered to be sufficiently accurate.

Figure 3:
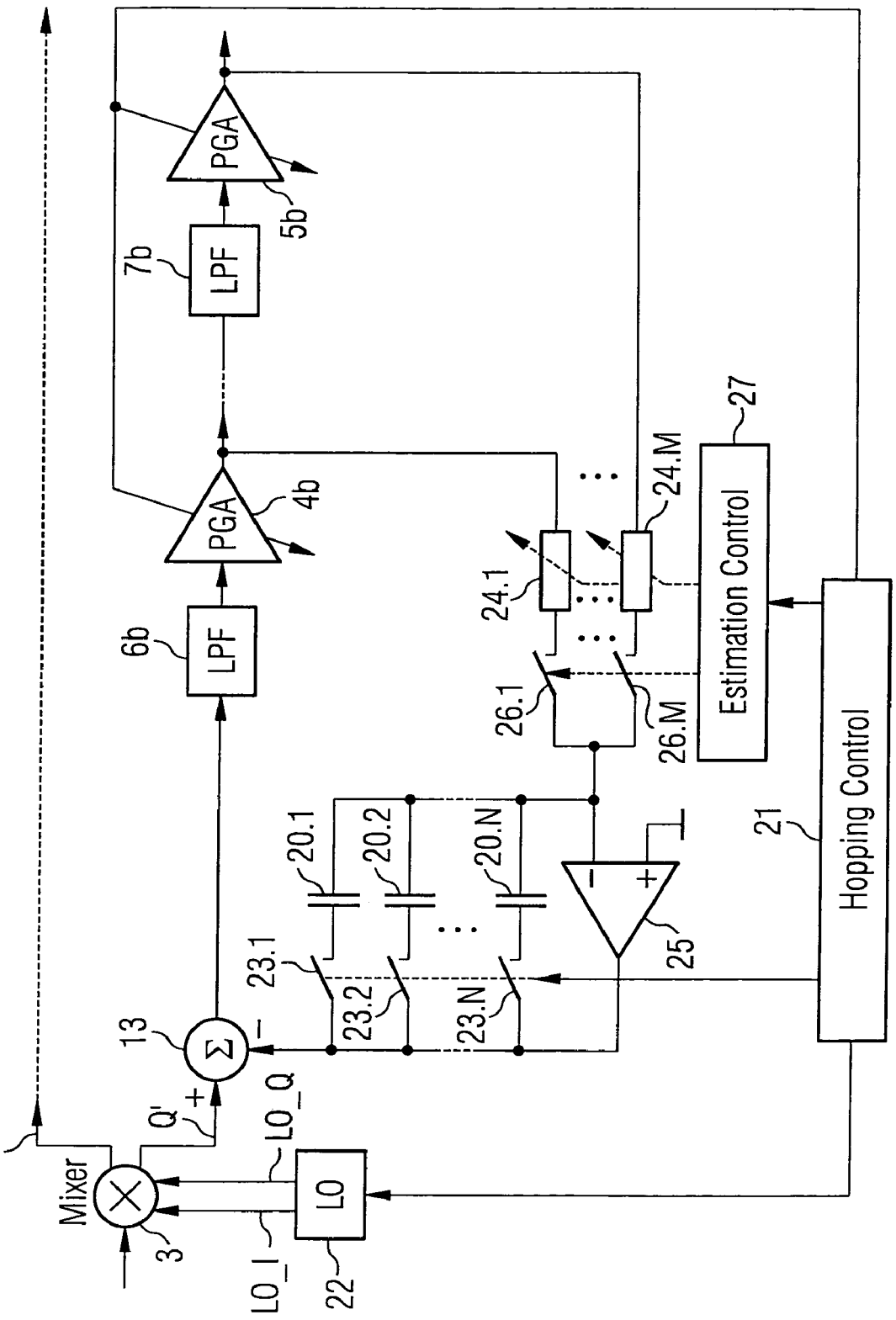
FIG. 3 is a block diagram illustrating an exemplary DC-offset correction circuit according to an embodiment of the invention.

FIG. 3 is an exemplary block diagram of a DC-offset correction circuit in a direct-conversion receiver of a band-hopping communication system (in particular a MB-OFDM system according to said specification) according to one embodiment of the invention. The circuit supports the aforesaid two operating modes. The block diagram is only illustrated for the Q-path of the receiver, for the I-path of the receiver the DC-offset correction is implemented in the same way. Thus, subsequent statements regarding the Q-path are also valid for the I-path.

The receiver includes an analog receiver chain, comprising cascaded LPF 6b and 7b and PGAs 4b and 5b. Typically, the signal output of the receiver chain is fed to an ADC (not shown). According to the embodiment illustrated in FIG. 3 the DC-offset correction circuit is an analog DC-offset correction circuit, which forms an analog feedback path coupling a particular signal in the receiver chain back to the output of the mixer 3. In particular, an appropriate analog correction signal value, generated by the DC-offset correction circuit, is subtracted from the signal Q' at the output of the mixer 3 by a combiner 13. The output signal of the combiner 13 is fed in the analog receiver chain.

Since the DC-offset is band-dependent, a different offset-correction signal value is provided for each band of the hopping scheme. Generally speaking, the band-specific offset-correction signal values are stored in analog memory elements, with the number of analog memory elements per phase path equaling the number N of hop bands. According to the exemplary MB-OFDM specification N=3 bands are supported. However, the number of hop bands may be reduced, e.g. to 2 bands or 1 band. In this case not all memory elements are used. Furthermore, in case a plurality of band groups is supported, either additional memory elements may be provided for these additional band groups or the same N=3 memory elements as mentioned above can be reused for the additional band groups. According to one embodiment of the invention illustrated in FIG. 3 the memory elements are implemented as identical capacitors 20.1-20.N, each storing an offset-correction signal value as an analog voltage.

The band hopping is controlled by a hopping controller 21, which adjusts the LO-signals LO-I and LO-Q, generated by the LO synthesizer 22, to the appropriate center frequency $f_1$-$f_N$ of the selected band. Additionally, the hopping controller 21 controls an analog selector (the term "analog" indicates that the signal to be switched is an analog signal), selecting the analog memory cell, i.e. the capacitor, which is assigned to the current hop band. This is valid for both operation modes, i.e. for the first and the second operation mode. Here, the selector is implemented by a plurality of switches 23.1-23.N, with each switch 23.1-23.N being connected in series to a corresponding capacitor 20.1-20.N, respectively.

In this example, the DC-offset correction circuit in the feedback path further comprises a low-pass filter, e.g. an integrator, the filter characteristic of which being adjustable. The integrator is implemented in this example with an operational amplifier circuit, including an operational amplifier 25, an adjustable resistor, selected from a plurality of adjustable resistors 24.1-24.M (e.g. M=2), and a capacitor in the feedback path of the operational amplifier 25, selected from said capacitors 20.1-20.N. The resistors 24.1-24.M are connected to different taps of the receiver chain in the forward path. The selection of one resistor from the plurality of resistors 24.1-24.M, and thus the selection of one tap of the receiver chain is accomplished by a selector, implemented by a plurality of switches 26.1-26.M, with each switch 26.1-26.M being connected in series to a corresponding resistor 24.1-24.M, respectively. The plurality of switches 26.1-26.M is controlled by an estimation control block 27. Further, in this embodiment the estimation control block 27 adjusts the resistors 24.1-24.M.

In the first operation mode during the receipt of the preamble the analog DC-offset correction circuit determines an appropriate offset-correction signal value for each band, which minimizes the offset at the receiver output. In one example, the determination of each offset-correction signal value is based on different signals at different taps of the receiver chain. Each time the hopping control block 21 selects a new band, a feedback path is closed, which reaches from a selected tap of the receiver chain, via the integrator, including the selected resistor 24.1-24.M, the operational amplifier 25 and the selected capacitor 20.1-20.N in the feedback path of the operational amplifier 25, to the combiner 13. In one example, during one band-specific estimation cycle different time constants of the feedback loop are used to obtain an accurate estimation of the offset-correction signal value in a very short time. This is accomplished by selecting both the time constant of the integrator, being dependent on the resistor value of the selected resistor 24.1-24.M, and the tap of the receiver in the forward path of the feedback loop.

In one example, at the beginning of a preamble symbol during a first time period (e.g. 20 ns) a fast, rough estimation is requested. Thus, the time constant of the integrator may be selected to be short, resulting in a low resistor value of the selected resistor 24.1-24.M. In addition, a first tap in the front part of the receiver chain, e.g. at the output of the PGA 4b, may be selected, further reducing the estimation delay. Thus, in a very short time a first estimation of the current offset-correction signal value is determined. Thereafter, in a second time period (e.g. 60 ns) the time constant of the integrator is increased by increasing the resistor value, thereby increasing the accuracy of the estimation. Further, a second tap (e.g. the output of the receiver chain), being located with respect to the signal direction after the first tap, may be selected, further increasing the estimation delay and the accuracy of the estimation.

The estimation cycle as aforesaid in one example is repeated for every band of the hopping scheme as preamble symbols assigned to different bands are received. In case a previously estimated offset-correction signal value for a specific band is sufficiently accurate, no further estimation may be performed when the receiver returns to that specific band during the receipt of the preamble (therefore, the integrator may be decoupled from the receiver chain).

In the second operation mode during the receipt of the payload of the burst the offset-correction signal values assigned to all bands of the hopping scheme are already estimated and stored in the capacitors 20.1-20.N. The band-specific DC-offset is corrected by reading the appropriate stored offset-correction signal value. This is accomplished, for example, by coupling the respective capacitor 20.1-20.N, being assigned to the current hop band, to the combiner 13. Further, the estimation of the offset-correction signal values is deactivated or set to a slow tracking mode. Thus, the offset-correction signal values, stored in the memory elements, i.e. in the capacitors 20.1-20.N, are either fixed or alternatively updated with a very slow rate (tracking mode). For the deactivation the estimation control block 27 decouples the integrator from the taps of the receiver chain. Thus, the capacitors 20.1-20.N hold their charge and their correction voltage. In case a tracking mode is considered, the estimation control block 27 may increase the time constant of the feedback loop, i.e. by coupling the integrator to the output of the PGA 5b at the output of the receiver chain and/or by increasing the resistor value of the selected resistor 24.1-24.M. The tracking mode could be used to compensate for the discharge of the capacitors 20.1-20.N due to leakage currents.

Figure 4:
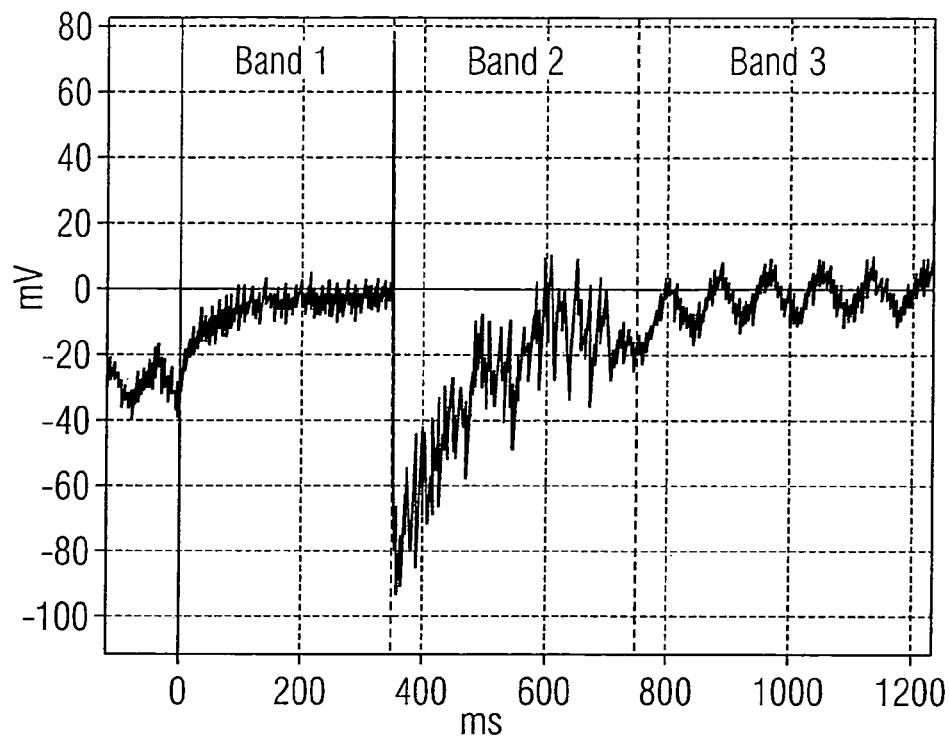
FIG. 4 is a simulated signal-time diagram illustrating the signal at the output of the receiver chain during the first operation mode of the DC-offset correction circuit according to the invention.
Figure 5:
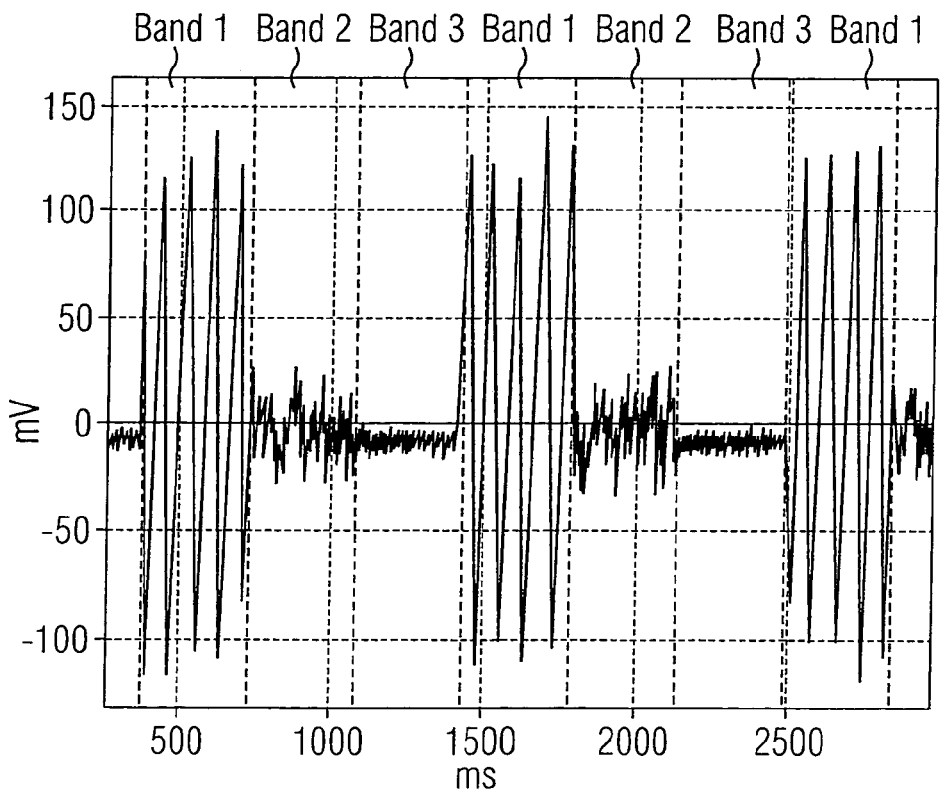
FIG. 5 is a simulated signal-time diagram illustrating the signal at the output of the receiver chain during the second operation mode of the DC-offset correction circuit according to the invention.

FIG. 4 and FIG. 5 are simulated signal-time diagrams of the signal at the output of the receiver chain, i.e. at the output of the PGA 5b, during the first and in the second operation mode of the DC-offset correction circuit, respectively. In both simulations the receiver is hopping between three bands of a hopping scheme roughly every 320 ns, with the receiver having different gain settings for the three bands. In FIG. 4 only in band 3 a modulated signal is present, whereas in FIG. 5 only in band 1 a modulated signal is provided.

In FIG. 4 the DC-offset correction circuit operates in the first operation mode, typically during the receipt of a preamble. Initially, all capacitors 20.1-20.N are discharged. Thus, the DC-offset correction circuit has to estimate the offset-correction signal values for all bands. As soon as the receiver hops to a specific band, the DC-offset correction circuit starts to estimate the band-specific offset-correction signal value, thereby compensating the DC-offset and storing the DC-offset signal value in the band-dedicated capacitor 20.1-20.N. The signal-time diagram in FIG. 4 demonstrates that the offset is reduced in a short time interval (in roughly ⅓ of 320 ns) to a reasonable level. This time interval is sufficiently short to allow for decoding the preamble information.

In FIG. 5 the DC-offset correction circuit operates in the second operation mode, typically during the receipt of a payload. Here, each time the receiver hops to a specific band, the respective band-specific capacitor 20.1-20.N, holding a previously estimated offset-correction signal value, is coupled to the combiner 13, thereby promptly compensating the DC-offset without significant transients.

Thus, the DC-offset correction circuit in FIG. 3 works in contrast to conventional approaches without a mandatory calibration interval, in which the receiver is not able to receive any information. In the first operation mode of the invention, the receiver may decode information contained in the preamble, albeit with reduced SNR since transients have to be tolerated. Further, the embodiment of the invention implemented for analog signals does not need any DAC or DACs in the feedback loop (however, such components may be included), thereby increasing the speed of the correction circuit compared to conventional approaches: In the first operation mode the time interval to estimate the respective offset-correction signal value is typically sufficiently short to decode information contained in the preamble, whereas in the second operation mode the offset-correction signal value are provided without noticeable delay or degradation of the SNR.

Figure 6:
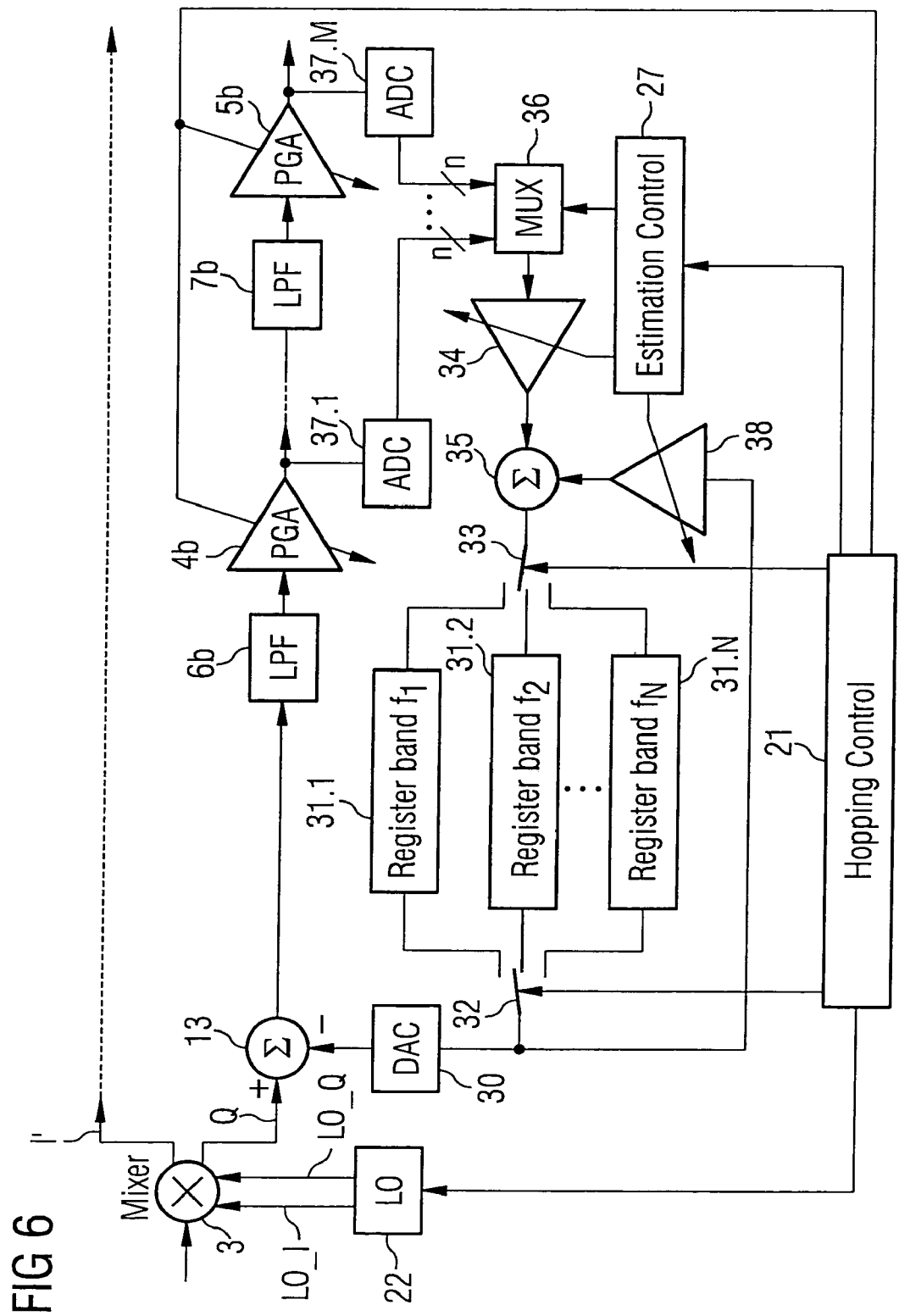
FIG. 6 is a block diagram illustrating an exemplary DC-offset correction circuit according to another embodiment of the invention.

FIG. 6 is an exemplary block diagram of a DC-offset correction circuit in a direct-conversion receiver of a band-hopping communication system (for example an MB-OFDM system according to its specification) according to another exemplary embodiment of the invention supporting the two operating modes as aforesaid. With respect to FIG. 3 and FIG. 6, it is noted that the same reference numerals or letters will be used to designate like or same elements having the same or similar function. Thus, preceding statements regarding elements in FIG. 3 are basically also valid for like or same elements in FIG. 6.

According to FIG. 6 the DC-offset correction circuit is a digital DC-offset correction circuit, which forms a digital feedback path coupling a particular signal in the receiver chain back to the output of the mixer 3. Here, an appropriate digital correction signal value, i.e. a digital number, generated by the DC-offset correction circuit, is digital-to-analog converted by a DAC 30. The converted analog signal is subtracted from the signal Q' at the output of the mixer 3 by the combiner 13.

Similar to FIG. 3, for each band of the hopping scheme a different offset-correction signal value is provided. Here, the band-specific offset-correction signal values are stored in band-dedicated digital registers 31.1-31.N, i.e. digital memory elements, with the number of registers per phase path equaling the number N of hop bands of the hopping scheme. According to the MB-OFDM specification typically N=3 bands are supported. However, the number of hop bands may be reduced, e.g. to 2 bands or 1 band. In this case not all memory elements are used. Furthermore, in case a plurality of band groups is supported, either additional memory elements may be provided for these additional band groups or the same N=3 memory elements as mentioned above can be reused for the additional band groups.

Analogously to FIG. 3, the band hopping is controlled by the hopping controller 21. Additionally, the hopping controller 21 controls a digital selector 32 (the term "digital" means, for example, that the signal to be switched is a digital signal), selecting the digital register 31.1-31.N which is assigned to the current hop band. This is valid for both operation modes, i.e. for the first and the second operation mode. Here, the selector 32 is implemented by a digital N-to-1 multiplexer 32, with each of the N inputs of the multiplexer 32 being connected to an output of a digital register 31.1-31.N and the output of the multiplexer 32 being coupled to the DAC 30. Thus, at each band hop the output of the proper register 31.1-31.N is connected to the input of the DAC 30, the output of which is connected to the combiner 13.

Analogously to the analog implementation in FIG. 3, the digital DC-offset correction circuit in the feedback path further comprises a low-pass filter, e.g. an integrator, the filter characteristic of which being adjustable. Here, the integrator is implemented by means of a digital filter. The digital filter comprises an adjustable digital amplifier 34, a digital combiner 35, a second selector 33, respectively selected digital register 31.1-31.N, said first selector 32, and an adjustable digital amplifier 38 in the feedback-loop, reaching from the output of the multiplexer 32 to one input of the combiner 35. The second selector 33 is implemented as a 1-to-N demultiplexer 33, with the input of the demultiplexer 33 being connected to the output of the combiner 35 and the N outputs of the demultiplexer 33 being coupled to the inputs of the N digital registers 31.1-31.N. Corresponding to the output-sided selection of one register 31.1-31.N via the multiplexer 32 the input of the selected register 31.1-31.N is connected to the output of the combiner 35 and thus to a selected tap of the receiver chain. Both the demultiplexer 33 and the multiplexer 32 are controlled by the hopping control block 21.

In one example, the input of the digital filter is driven by the output of a second digital multiplexer 36 with M (e.g. M=2) inputs. Each input of the multiplexer 36 is coupled to a different tap of the receiver chain via a separate ADC 37.1-37.M. The multiplexer 36 is controlled by an estimation control block 27. Further, the estimation control block 27 in one embodiment adjusts the digital amplifiers 34 and 38. Here, each tap of the receiver chain is connected to a separate ADC 37.1-37.M. Alternatively, an analog multiplexer, input-sided coupled to the taps of the receiver chain and output-sided coupled to a single ADC, may be used instead (not shown).

Similar to the analog implementation in FIG. 3, in the first operation mode during the receipt of the preamble the digital DC-offset correction circuit determines for each band an appropriate offset-correction signal value, which minimizes the offset at the receiver output. In one example, the determination of each offset-correction signal value is based on different signals at different taps of the receiver chain. Each time the hopping control block 21 selects a new band being assigned to a new received symbol, the feedback path of the digital correction circuit is closed. In one example, during one estimation cycle different time constants of the feedback loop are used to obtain an accurate estimation of the offset-correction signal value in a very short time. This is accomplished by varying both the gain in the integrator loop and the tap of the receiver in the forward path of the feedback loop.

In one embodiment, at the beginning of a preamble symbol during a first time period (e.g. 20 ns) a fast, rough estimation is requested. Thus, the gain of the integrator is selected to be small. In addition, a first tap in the front part of the receiver chain, e.g. at the output of the PGA 4*b*, may be selected, further reducing the estimation delay. Thereafter, in a second time period (e.g. 60 ns) the gain of the integrator is increased, thereby increasing the accuracy of the estimation. Further, a second tap, e.g. the output of the PGA 5*b* at the output of the receiver chain, being located with respect to the signal direction after the first tap, may be selected, further increasing the estimation delay and the accuracy of the estimation.

The estimation cycle as aforesaid is repeated in one embodiment for every band of the hopping scheme as preamble symbols assigned to different bands are received.

In case a previously estimated offset-correction signal value for a specific band is sufficiently accurate, no further estimation may be performed when the receiver returns to that specific band during the receipt of the preamble (therefore, the integrator may be decoupled from the receiver chain).

In the second operation mode during the receipt of the payload the digital offset-correction signal values assigned to all bands of the hopping scheme are already estimated and stored in the digital registers 31.1-31.N. The band-specific DC-offset is corrected by reading the appropriate stored offset-correction signal value. This is accomplished in one example by coupling the respective register 31.1-31.N, being assigned to the current hop band, via the DAC 30 to the combiner 13.

Further, the estimation of the offset-correction signal values is deactivated or set to a slow tracking mode as already mentioned with respect to the analog embodiment in FIG. 3. Thus, the offset-correction signal values, stored in the registers 31.1-31.N, are either fixed or alternatively updated with a very slow rate (tracking mode). For the deactivation the estimation control block 27 decouples the integrator from the taps of the receiver chain, e.g. by reducing the gain of the digital amplifier 34.

For reducing the complexity of the circuit each multibit ADC 37.1-37.M may be replaced by a comparator, i.e. a 1-bit ADC (not shown). In this case also the signal processing in the feedback path is 1-bit wide. In addition, in such an example the operation of the DC-offset correction circuit is simplified since the operation of the DC-offset correction circuit is independent from the gain setting chosen in the receiver chain (forward path) and thus only the sign of the signals in the receiver chain is observed.

The simulated signal-time diagrams in FIG. 4 and FIG. 5 are basically also valid for the digital embodiment in FIG. 6.

Similarly to the analog DC-offset correction circuit in FIG. 3, the digital embodiment in FIG. 6 may work in contrast to conventional approaches without a mandatory calibration interval, in which the receiver is not able to receive any information. In the first operation mode the time interval to estimate the respective offset-correction signal value is typically sufficiently short to decode information contained in the preamble, whereas in the second operation mode the offset-correction signal values are provided without noticeable delay or degradation of the SNR.

Additional modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

In addition, while a particular feature or aspect of an embodiment of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise." The terms "coupled" and "connected", along with derivatives may have been used. It should be understood that these terms may have been used to indicate that two elements co-operate or interact with each other regardless whether they are in direct physical or electrical contact, or they are not in direct contact with each other. Furthermore, it should be understood that embodiments of the invention may be implemented in discrete circuits, partially integrated circuits or fully integrated circuits or programming means. Also, the term "exemplary" is merely meant as an example, rather than the best or optimal. It is also to be appreciated that features and/or elements depicted herein are illustrated with particular dimensions relative to one another for purposes of simplicity and ease of understanding, and that actual dimensions may differ substantially from that illustrated herein.

What is claimed is:

1. A DC-offset correction circuit for a receiver of a band-hopping communication system with a plurality of hop bands, the receiver comprising an analog receiver chain, comprising:
an analog circuit coupled to a tap of the analog receiver chain and configured to generate a plurality of analog offset-correction signal values, each of which are assigned to a respective hop band of the plurality of hop bands, the analog circuit comprising:
a first analog selector configured to select one analog offset-correction signal value from the plurality of analog offset-correction signal values, the selected analog offset-correction signal value being assigned to a current hop band;
a combiner coupled to the first analog selector, and configured to combine a received signal with the selected analog offset-correction signal value and feed the analog receiver chain therewith; and
a plurality of analog memory elements, each of which are configured to store one offset-correction signal value.

2. The DC-offset correction circuit of claim 1, wherein the plurality of analog memory elements comprise capacitors.

3. The DC-offset correction circuit of claim 1, wherein the first analog selector comprises a plurality of switches, each of which are coupled to a respective one of the plurality of memory elements.

4. A DC-offset correction circuit for a receiver of a band-hopping communication system with a plurality of hop bands, the receiver comprising an analog receiver chain, comprising:
means for generating a plurality of analog offset-correction signal values, each of which are assigned to a hop band of the plurality of hop bands, said means for generating being coupled to a tap of the analog receiver chain, and comprising:
means for storing the plurality of analog offset-correction signal values;
means for selecting one analog offset-correction signal value from the plurality of analog offset-correction signal values, wherein the selected analog offset-correction signal value is assigned to a current hop band; and
means for combining a received signal with the selected analog offset-correction signal value and for feeding the analog receiver chain with the combined signal.

5. The DC-offset correction circuit of claim 4, wherein the storing means comprises a plurality of capacitors.

6. The DC-offset correction circuit of claim 4, wherein the selecting means comprises means for switching coupled to the storing means.

7. A method of correcting a DC-offset in a receiver of a band-hopping communication system with a plurality of hop bands, the receiver comprising an analog receiver chain, comprising:
tapping analog signal values from taps of the analog receiver chain;
generating a plurality of analog offset-correction signal values from the analog signal values, each of which being assigned to a hop band;
selecting an analog offset-correction signal value from the plurality of analog offset-correction signal values, the selected analog offset-correction signal value being assigned to a current hop band; and
combining a received signal with the selected analog offset-correction signal value;
wherein the method comprises a first operational mode and a second operational mode, and wherein the tapping analog signal values, and generating a plurality of analog offset-correction signal values, are carried out in the first operational mode, and wherein selecting an analog offset-correction signal value and combining a received signal with the selected analog offset-correction signal value are carried out in the second operational mode.

8. The method of claim 7, wherein the communication system comprises transmission and reception of a plurality of signal bursts, each signal burst of the plurality of signal bursts comprises a preamble and a payload, and wherein the first operational mode is carried out during the preamble and the second operational mode is carried out during the payload.

9. A DC-offset correction circuit for a receiver of a band-hopping communication system with a plurality of hop bands, the receiver comprising an analog receiver chain, comprising:
an analog-to-digital converter coupled to a tap of the analog receiver chain or connected to the analog receiver chain as part of the receiver;
a digital circuit coupled to the output of the analog-to-digital converter and configured to generate a plurality of digital offset-correction signal values, each of which are assigned to a respective hop band, where the digital circuit comprises a plurality of digital memory elements, wherein each are configured to store an offset-correction signal value;
a first digital selector coupled to the digital circuit and configured to select a digital offset-correction signal value from the plurality of digital offset-correction signal values, wherein the selected digital offset correcting signal value is assigned to a current hop band;
a digital-to-analog converter coupled to the first digital selector and configured to receive the selected digital offset-correction signal value and output an analog offset-correction signal value and response thereto; and
a combiner coupled to the digital-to-analog converter and configured to combine a received signal with the selected analog offset-correction signal value, and feed the analog receiver chain with the combined signal.

10. The DC-offset correction circuit of claim 9, wherein the plurality of digital memory elements comprise digital registers.

11. A DC-offset correction circuit for a receiver of a band-hopping communication system with a plurality of hop bands, the receiver comprising an analog receiver chain, comprising:
first converting means for converting analog signals to digital signals, the first converting means coupled to a tap of the receiver chain or connected to the receiver chain as part of the receiver;
means for generating a plurality of digital offset-correction signal values, each of which are assigned to a respective hop band and wherein an input of the generating means is coupled to the output of the first converting means, the generating means comprising:

means for storing the plurality of digital offset-correction signal values;

means for selecting a digital offset-correction signal value from the plurality of digital offset-correction signal values, the selected digital offset correcting signal value being assigned to the current hop band;

second converting means for converting digital signals to analog signals, wherein the second converting means is adapted to receive the selected digital offset-correction signal value and output a selected analog offset-correction signal value; and means for combining a received signal with the selected analog offset-correction signal value and for feeding the analog receiver chain with the combined signal.

12. The DC-offset correction circuit of claim 11, wherein the storing means comprises a plurality of digital registers.

13. A method of correcting a DC-offset in a receiver of a band-hopping communication system with a plurality of hop bands, the receiver comprising an analog receiver chain, comprising:

tapping analog signal values from taps of the analog receiver chain, converting the analog signal values to digital signal values;

generating a plurality of digital offset-correction signal values from the digital signal values, each of which are assigned to a respective hop band;

selecting a digital offset-correction signal value from the plurality of digital offset-correction signal values;

converting the selected digital offset-correction signal value to an analog offset-correction signal value; and combining a received signal with the analog offset-correction signal value, wherein the method comprises a first operational mode and a second operational mode, and wherein the tapping analog signal values, converting the analog signal values to digital signal values, and generating a plurality of digital offset-correction signal values, are carried out in the first operational mode, and wherein selecting a digital offset-correction signal value, converting the selected one digital offset-correction signal value, and combining a received signal with the selected analog offset-correction signal value are carried out in the second operational mode.

14. The method of claim 13, wherein the communication system comprises transmission and reception of a plurality of signal bursts, each signal burst of the plurality of signal bursts comprises a preamble and a payload, and wherein the first operational mode is carried out during the preamble and the second operational mode is carried out during the payload.

15. A DC-offset correction circuit for a receiver of a band-hopping communication system with a plurality of hop bands, the receiver comprising an analog receiver chain, comprising:

an analog circuit coupled to a tap of the analog receiver chain and configured to generate a plurality of analog offset-correction signal values, each of which are assigned to a respective hop band of the plurality of hop bands, the analog circuit comprising:

a first analog selector configured to select one analog offset-correction signal value from the plurality of analog offset-correction signal values, the selected analog offset-correction signal value being assigned to a current hop band;

a combiner coupled to the first analog selector, and configured to combine a received signal with the selected analog offset-correction signal value and feed the analog receiver chain therewith; and a second analog selector coupled to the analog circuit, and configured to selectively couple the analog circuit to different taps of the analog receiver chain.

16. A DC-offset correction circuit for a receiver of a band-hopping communication system with a plurality of hop bands, the receiver comprising an analog receiver chain, comprising:

means for generating a plurality of analog offset-correction signal values, each of which are assigned to a hop band of the plurality of hop bands, said means for generating being coupled to a tap of the analog receiver chain, and comprising:

means for selecting one analog offset-correction signal value from the plurality of analog offset-correction signal values, wherein the selected analog offset-correction signal value is assigned to a current hop band;

means for combining a received signal with the selected analog offset-correction signal value and for feeding the analog receiver chain with the combined signal; and means for selectively coupling the generating means to different taps of the analog receiver chain.

17. A DC-offset correction circuit for a receiver of a band-hopping communication system with a plurality of hop bands, the receiver comprising an analog receiver chain, comprising:

an analog-to-digital converter coupled to a tap of the analog receiver chain or connected to the analog receiver chain as part of the receiver;

a digital circuit coupled to the output of the analog-to-digital converter and configured to generate a plurality of digital offset-correction signal values, each of which are assigned to a respective hop band a first digital selector coupled to the digital circuit and configured to select a digital offset-correction signal value from the plurality of digital offset-correction signal values, wherein the selected digital offset correcting signal value is assigned to a current hop band;

a digital-to-analog converter coupled to the first digital selector and configured to receive the selected digital offset-correction signal value and output an analog offset-correction signal value and response thereto;

a combiner coupled to the digital-to-analog converter and configured to combine a received signal with the selected analog offset-correction signal value, and feed the analog receiver chain with the combined signal; and a second selector configured to selectively couple the digital circuit to different taps of the analog receiver chain.

18. A DC-offset correction circuit for a receiver of a band-hopping communication system with a plurality of hop bands, the receiver comprising an analog receiver chain, comprising:

first converting means for converting analog signals to digital signals, the first converting means coupled to a tap of the receiver chain or connected to the receiver chain as part of the receiver;

means for generating a plurality of digital offset-correction signal values, each of which are assigned to a respective hop band and wherein an input of the generating means is coupled to the output of the first converting means, the generating means comprising:
means for selecting a digital offset-correction signal value from the plurality of digital offset-correction signal values, the selected digital offset correcting signal value being assigned to the current hop band;
second converting means for converting digital signals to analog signals, wherein the second converting means is adapted to receive the selected digital offset-correction signal value and output a selected analog offset-correction signal value; and
means for combining a received signal with the selected analog offset-correction signal value and for feeding the analog receiver chain with the combined signal; and
means for selectively coupling the generating means to different taps of the analog receiver chain.

* * * * *